Sept. 4, 1928.  
J. F. O'CONNOR  
FRICTION SHOCK ABSORBING MECHANISM  
Filed July 18, 1927   2 Sheets-Sheet 2
1,683,399
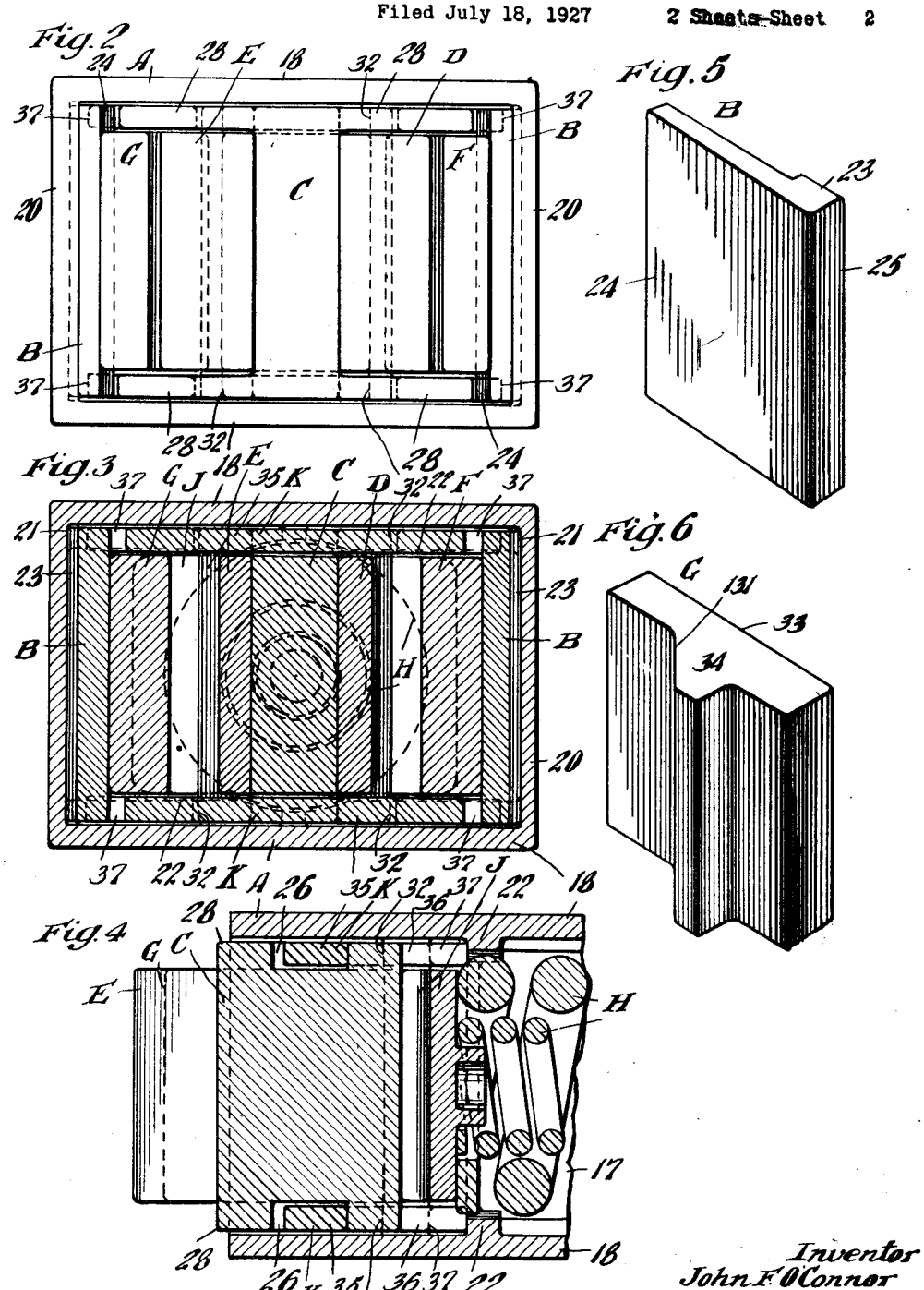
Witness
Wm. Geiger
Inventor
John F. O'Connor
By George I. Haight
His Atty.

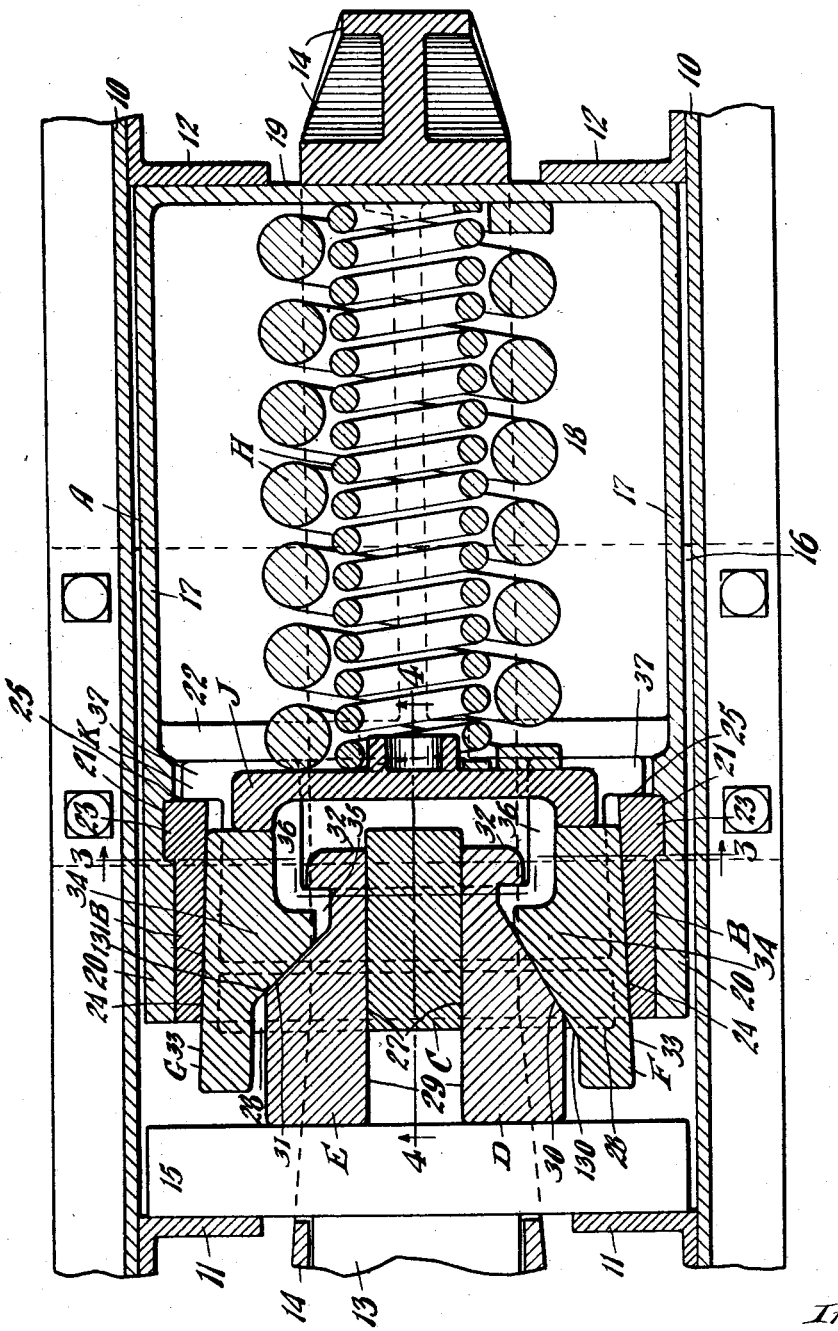

Patented Sept. 4, 1928.

1,683,399

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed July 18, 1927. Serial No. 206,564.

This invention relates to improvements in friction shock absorbing mechanisms.

One object of the invention is to provide a friction shock absorbing mechanism of high capacity, especially adapted for railway draft riggings, including a friction shell and co-operating friction elements wherein one of the friction elements is in the form of a post having limited movement with respect to the shell, a set of wedge friction elements co-operating with the post, means being provided for retaining the post and wedge elements assembled with the mechanism.

Another object of the invention is to provide a friction shock absorbing mechanism including a friction casing, friction shoes co-operating with the casing a pair of wedge blocks having engagement with the shoes and a central friction member having limited movement with respect to the casing, wherein the cooperating wedge members and friction shoes have inter-engaging sets of wedge faces certain of which are disposed at a relatively blunt angle with respect to the longitudinal axis of the mechanism and the remaining sets of co-operating faces are disposed at a relatively keen wedge acting angle with respect to said axis, the friction post being laterally displaceable to compensate for the difference in angularity of the sets of wedge faces.

A more specific object of the invention is to provide a shock absorbing mechanism of the character hereinbefore indicated including a friction shell and a plurality of relatively movable friction elements, the relative movement of which is yieldingly resisted by spring means, wherein simple and efficient means is employed for holding the parts assembled, said means including anchoring members engaging detachable liners secured to the friction shell and having engagement with certain of the friction elements to limit outward movement of the same.

Other objects and advantages of the invention will more clearly appear from the description and claims hereinafter following.

In the drawings, forming a part of this specification, Figure 1 is a longitudinal, horizontal, sectional view of a portion of a railway draft rigging showing my improvements in connection therewith. Figure 2 is a front end elevational view of the shock absorbing mechanism proper. Figure 3 is a transverse, vertical, sectional view corresponding substantially to the line 3—3 of Figure 1. Figure 4 is a longitudinal, vertical, sectional view of the front end portion of the shock absorbing mechanism, corresponding substantially to line 4—4 of Figure 1. And Figures 5 and 6 are detailed perspective views of a liner and a friction shoe, respectively, employed in connection with my improved shock absorbing mechanism.

In said drawings 10—10 indicate channel shaped center or draft sills of a railway car under frame, to the inner sides of which are secured the usual front stop lugs 11—11 and rear stop lugs 12—12. The inner end portion of the draw bar is indicated by 13 to which is operatively connected a yoke 14 of well known form. The shock absorbing mechanism proper as well as a front main follower 15 are disposed within the yoke and the yoke in turn is supported in operative position by a detachable saddle plate 16 secured to the draft sills.

My improved shock absorbing mechanism proper as shown comprises broadly, a casing A; a pair of liners B—B; a friction post C; two wedge blocks D and E; two friction shoes F and G; a spring resistance H; a spring follower J and retaining elements K—K.

The casing A is in the form of a generally rectangular, box like member having longitudinal disposition spaced vertical side walls 17—17 horizontally disposed spaced top and bottom walls 18—18 and a transverse vertical rear end wall 19. The end wall 19 co-operates with the rear stop lugs 12 in the manner of the usual rear follower. The forward end portions of the side walls 17 of the casing A are thickened as most clearly shown in Figure 1, the thickened sections being indicated by 20. The casing A is open at the forward end and the inner walls of the thickened sections 20 are vertically grooved, as indicated at 21 thereof, providing seats inwardly of the forward end of the casing for a purpose hereinafter described. The top and bottom walls 18 are provided with transverse relatively heavy ribs 22—22 presenting front abutment faces adapted to co-operate with the retaining means to prevent inward movement thereof.

The liners B, which are two in number, are detachably connected to the opposed side walls 17 of the casing. Each of the liners B is in the form of a relatively heavy rectangular plate as most clearly shown in Figure 5.

At the rear end the liner B is provided with a lateral extension in the form of a lug 23. The lugs 23 of the liners B are adapted to snugly fit within the seats 21 of the side walls of the casing, thereby serving to hold the liners detachably assembled with the casing. On the inner side each liner B has a longitudinally disposed flat friction surface 24, the surfaces 24 of the opposed liners converging inwardly of the mechanism. As most clearly shown in Figure 1 the liners B are of such thickness that they project an appreciable distance inwardly beyond the side walls of the casing, thereby presenting end abutment faces 25, adapted to co-operate with the retaining elements K in a manner hereinafter pointed out.

The friction post C is in the form of a heavy rectangular plate like member and is disposed centrally of the mechanism. The top and bottom portions of the post C are transversely slotted as indicated at 26, the opposite sides of the post present longitudinally disposed flat friction surfaces 27—27 which co-operate with friction surfaces on the wedge blocks D and E. At the forward end the post is provided with laterally expanding top and bottom arms 28—28 which cooperate with the retaining elements K—K to limit the inward movement of the post.

The wedge blocks D and E are disposed at opposite sides of the post and are of similar design except as hereinafter pointed out. Each wedge block presents a flat front end face adapted to bear on the inner side of the main follower 15. On the inner side each block is provided with a longitudinally disposed flat friction surface 29 adapted to co-operate with the friction surface 27 at the corresponding side of the post C. On the outer side each block is provided with a wedge face adapted to co-operate with one of the friction shoes. The wedge face of the block D is designated by 30 and that of the block E is designated by 31. As clearly illustrated in Figure 1, the wedge face 30 is disposed at a relatively keen wedge acting angle with respect to the longitudinal axis of the mechanism, while the wedge face 31 of the block E is disposed at a relatively blunt releasing angle with respect to said axis. Each wedge block has a lateral enlargement at the inner end thereof, the enlarged portion and the adjacent section of the wedge block extending above and below the body portion proper of the block thereby presenting top and bottom lugs 32 which serve as abutment elements to limit outward movement of the wedge block.

The friction shoes F and G are of similar design except as hereinafter pointed out. Each shoe presents a longitudinally disposed flat outer friction surface 33 adapted to engage with the corresponding friction surface 24 of the liner B at the same side of the mechanism. As most clearly indicated in Figures 1, 2 and 3, the friction shoes F and G are interposed between the wedge blocks and the liners of the friction casing. The shoes F and G are laterally enlarged midway between the ends thereby providing inward extensions 34. The enlarged portion 34 of each shoe is provided with a front wedge face adapted to co-operate with the wedge face of the wedge block at the corresponding side of the mechanism. The wedge face of the shoe G is designated by 131 and is adapted to co-operate with the wedge face 31 of the wedge block E. The wedge face of the shoe F is designated by 130 and is correspondingly inclined to and adapted to co-operate with the wedge face 30 of the wedge block D.

The retaining elements K—K are of similar design and as most clearly illustrated in Figure 4 are interposed between the top and bottom walls of the casing and the friction system of the mechanism. Each of the retaining elements comprise a transverse plate like bar section 35 and arms 36 rearwardly extending therefrom. The arms 36 are provided with lateral extensions 37 at the rear ends thereof presenting retaining lugs which engage in back of the liners B to limit outward movement of the retaining elements. As clearly shown in Figure 1 the inner ends of the arms 36 of the retaining elements are flat and present transverse abutment faces which co-operate with the ribs 22 of the top and bottom walls of the casing to positively hold the retaining elements against movement inwardly of the casing. The parts are so proportioned that the lug portions of the retaining elements substantially fit between the inner ends of the liners and the ribs 22. The bar like sections 35 of the retaining elements are engaged within the transverse slots at the top and bottom of the post C thereby holding the post assembled with the casing. As illustrated in Figure 4 the slots 26 are of greater width than the arms 35 thereby permitting a certain amount of lost motion between these parts. Due to the lost motion provided the post is permitted to move inwardly of the casing during the initial portion of the compression stroke of the mechanism to provide for a certain amount of preliminary action. It will be evident that upon inward movement of the post C the front walls of the slots 26 will engage the front edges of the barlike sections 35 of the retaining elements K and the inner edges of the top and bottom arms 28 will also engage the front edges of the sections 35 and the post will be positively arrested the force being transmitted through the retaining elements K to the abutment ribs 22 on the top and bottom walls of the casing. Outward movement of the post C is limited by engagement of the rear walls of the slots 26 with the rear edges of the transverse sections 35 of the retaining elements K. Outward movement of the wedge blocks D and E is also limited by the retaining elements K, the top and bottom lugs 32 of the wedge blocks engaging in back of sections 35 of the retaining elements.

The spring resistance means H comprises a relatively light inner coil and a heavier outer coil, the two coils having their rear ends bearing directly on the transverse wall 19 of the casing A. The spring follower J is interposed between the spring resistance means H and the inner ends of the friction shoes F and G. As most clearly illustrated in Figure 1, the spring follower J has forwardly projected flanges at the opposite sides thereof which bear directly on the friction shoes. The spring follower J is also provided with a central hollow boss on the rear side thereof adapted to engage within the inner coil of the spring resistance thereby holding the springs centered relatively to the spring follower.

When the mechanism is assembled the springs are placed under initial compression thereby compensating for wear of the various friction and wedge faces of the mechanism. Due to the springs being under initial compression the shoes are urged outwardly thereby forcing the wedge faces thereof against the wedge faces of the wedge blocks D and E, causing a spreading action thus forcing the friction shoes laterally outwardly against the liners and holding the latter in assembled position with the lugs 23 engaged within the seats 21 of the thickened sections 20 of the side walls of the casing A.

In assembling the mechanism the friction post C, the wedge blocks D and E, the friction shoes F and G and the liners B—B are placed together and the retaining elements K—K put in position. With the friction system thus far assembled the parts while laterally compressed are entered through the open front end of the casing the main spring resistance H and the spring follower J having first been placed within the casing. The assembled friction system is forced into the casing until the lug 23 of the liners B register with the slots 21 of the side walls of the casing, whereupon the parts are permitted to expand under the influence of the spring resistance H, so as to seat the lugs 23 within the corresponding seats 21. It will be clear that the retaining elements which are in engagement with the liners, the friction post C and the wedge elements D and E will be positively held against outward movement and yet a slight inward movement of the friction post is permitted and free inward movement of the wedge blocks D and E is also had. Inasmuch as the wedge blocks D and E are positively limited in their outward movement the same through the wedge faces thereof engaging the wedge faces of the friction shoes, will maintain the shoes and other parts assembled with the casing.

The operation of my improved shock absorbing mechanism assuming a compressed stroke, is as follows:

The front follower 15 and the casing A will be moved relatively toward each other thereby forcing the wedge blocks D and E inwardly of the mechanism, against the spring resisted friction shoes F and G. Due to the co-operating keen wedge faces of the wedge block D and the shoe F a lateral spreading action will be set up thereby forcing the friction shoes F and G into intimate contact with the friction surfaces of the liners B. The resultant lateral movement of the parts will be accommodated by the friction post C as the latter is laterally displaceable to a limited extent. As the wedge blocks D and E are carried inwardly of the casing the shoes will be forced inwardly also and due to the friction between the wedge blocks and the post the latter will also be carried inwardly of the casing.

The described action continues until inward movement of the friction post C is positively limited by engagement of the front end walls of the slots 26 and the rear edges of the arms 28 with the retaining elements J, the retaining elements J being held against inward movement by the ribs 22 on the casing, as hereinbefore pointed out. Upon movement of the post C being arrested, the wedge blocks D and E will be forced to move relatively to the post, the friction surfaces of the wedge block slipping on the friction surfaces at the opposite side of the posts. The friction thus created is additional to the friction produced between the friction shoes and the liners B thereby greatly augmenting the capacity of the gear. Inasmuch as the friction surfaces of the liners B converge inwardly of the mechanism friction shoes F and G will be forced laterally inwardly toward each other as the compression of the mechanism progresses and this lateral movement is accommodated by the co-operating sets of blunt wedge faces on the wedge block E and shoe G. It will be evident that on account of this lateral displacement of the friction shoes a lateral movement of the friction post C is also necessary. Inasmuch as the post C is freely displaceable laterally, this action is readily taken care of.

The described compression action continues until the actuating force is reduced or the inward movement of the follower 15 is limited by engagement with the front end of the casing A. Upon engagement of the casing by the follower the actuating force will be transmitted directly through these parts to the stop lugs of the draft sills, the casing acting as a solid column load transmitting member to prevent the main springs from being unduly compressed. During release when the actuating pressure is reduced the expansive action of the spring resistance H will force the friction shoes outwardly the shoes in turn forcing the wedge blocks outwardly also. During the initial releasing action, there is a slight outward movement of the post C in unison with the wedge blocks D and E thereby facilitating release of the wedge means. After slight outward movement of the post C the rear end walls of the slots 26 thereof engage the rear edges of the transverse sections 35 of the retaining elements G thereby positively stopping movement of the post. During the further releasing action, the wedge blocks D and E are forced to slip outwardly on the post C and the friction shoes F and G slip outwardly on the friction surfaces of the liners B. Outward movement of the wedge blocks D and E is finally arrested by engagement of the lugs 32 thereof with the retaining elements K, thereby also limiting outward movement of the shoes F and G.

I have herein shown and described what I now consider the preferred manner of carrying out my invention, but the same is merely illustrative, and I contemplate all changes and modifications that come within the scope of the claims appended hereto.

I claim:—

1. In a friction shock absorbing mechanism, the combination with a friction shell; of friction shoes co-operating with the shell; a wedge block having engagement with each shoe, one of said blocks and the shoe co-operating therewith having engaging wedge faces disposed at a relatively keen wedge acting angle with respect to the longitudinal axis of the mechanism, and the other wedge block and shoe having engaging wedge faces disposed of at a relatively blunter angle to said axis; a friction element interposed between said wedge blocks, said element being laterally displaceable; and spring resistance means opposing inward movement of the shoes.

2. In a friction shock absorbing mechanism, the combination with a casing provided with interior friction surfaces; friction shoes having frictional contact with the friction surfaces of the casing; a pressure transmitting member co-operating with each shoe, said members and shoes having co-operating sets of wedge faces, certain of said co-operating sets of faces being disposed at a keen wedge acting angle with respect to the direction of the applied force and the remaining sets of co-operating faces being disposed at a relatively blunt releasing angle with respect to said direction; a central friction member having limited movement with respect to the casing and frictional engagement with the pressure transmitting members; said central member being laterally displaceable and spring resistance means opposing relative movement of the casing and shoes.

3. In a friction shock absorbing mechanism, the combination with a casing; of a central friction element having longitudinally disposed friction surfaces; means for anchoring said element to the casing including liners detachably connected to the casing and a retaining element limited against movement outwardly of said casing by said liners, said retaining means having an abutment face limiting outward movement of the friction element; wedge blocks having frictional engagement with the friction element; friction shoes having wedging engagement with the wedge blocks; said shoes and liners having co-operating friction surfaces; and spring resistance means opposing relative movement of the casing and shoes.

4. In a friction shock absorbing mechanism the combination with a casing; of removable liners anchored to opposed walls of the casing; friction shoes co-operating with the liners; wedge blocks engaging said shoes; a friction post interposed between said wedge blocks and having frictional engagement therewith; retaining means for said post and wedge blocks, said retaining means being anchored to the liners; and spring resistance means within the casing co-operating with the shoes.

5. In a friction shock absorbing mechanism, the combination with a casing having opposed side walls; of detachable liners secured to said side walls; a pair of friction shoes co-operating with said liners; a central friction post; wedge means having frictional engagement with the post and wedging engagement with the shoes; retaining means limiting outward movement of the wedge means and post, said retaining means being anchored to the liners; and spring resistance means opposing relative movement of the casing and shoes, said spring resistance means being under initial compression thereby forcing the shoes against the wedge means to spread the shoes apart to hold the liners in anchored relation to the casing.

6. In a friction shock absorbing mechanism, a combination with a cage having opposed side walls; of liners movably secured to the side walls, said liners presenting interior friction surfaces; shoes having frictional engagement with the liners; wedge blocks engaging said shoes; a friction post interposed between said wedge blocks; anchoring means for the wedge blocks and posts; said anchoring means having lugs engaging behind the liners to limit outward movement of the anchoring means, said anchoring means having abutment faces co-operating with abutment faces on the wedge blocks and post to limit outward movement thereof; said anchoring means and cage having co-operating abutment faces thereon to limit inward movement of the anchoring means, and said post and anchoring means having co-operating abutments thereon for limiting inward movement of the post; and spring resistance means opposing relative movement of said shoes and cage.

7. In a friction shock absorbing mechanism, the combination with a friction shell; of friction shoes cooperating with the shell; a central friction post; a split wedge comprising a pair of members disposed at opposite sides of the post and having wedging engagement with the shoes; and means carried by the shell, cooperating with the abutment shoulders on the post and split wedge members, to limit outward movement thereof.

8. In a friction shock absorbing mechanism, the combination with a casing provided with interior friction surfaces; of a friction post within the casing; friction means cooperating with the post and friction shell surfaces, said friction means including a split wedge comprising two members disposed at opposite sides of the post; retaining means carried by the shell and cooperating with both the post and split wedge to limit outward movement thereof; and a spring resistance opposing inward movement of the friction means.

In witness that I claim the foregoing I have hereunto subscribed my name this 11th day of July, 1927.

JOHN F. O'CONNOR.